United States Patent Office.

LEONARD WOOLWORTH, OF ALBION, WISCONSIN.

Letters Patent No. 63,449, dated April 2, 1867.

IMPROVED CEMENT.

*The Schedule referred to in these Letters Patent and making part of the same.*

TO ALL WHOM IT MAY CONCERN:

Be it known that I, LEONARD WOOLWORTH, of the town of Albion, county of Dane, and State of Wisconsin, have invented a new Cement for setting thimble skeins on wagon-axle trees, and for other mechanical purposes, such as stopping leaks in aqueducts, &c.; and I do hereby declare the following is a full and exact description thereof.

The nature of my invention consists in the incorporation of certain ingredients the result of which is a cement that is superior to any other known article for setting thimble skeins on wagon-axle trees, adhering freely to any solid substance to which it is applied, being durable, and impervious to water or grease.

To enable others skilled in the art to make and use my invention, I will proceed to describe the composition of said cement.

In general I compose this cement of refuse paints, linseed oil, Japan dryer, rosin, and common glue, compounded in the following proportions: For a gallon of cement take refuse paints (*i. e.*, paint skins) sufficient to make, when melted, three quarts; add thereto one-third pint linseed oil and one-half pint Japan dryer; heat, stirring often, until the mass will scorch a feather. Remove from the fire and add one pound of rosin; stir until thoroughly melted. When sufficiently cooled, that it will melt glue without crisping it, add one-half pound, stirring briskly until thoroughly incorporated. I can also use any or all of the pigments, all of the dryers, copal varnish, &c., &c.

What I claim as my invention, and desire to secure by Letters Patent, is—

The use of my new cement, as herein described, using as materials for its composition the articles above enumerated.

LEONARD WOOLWORTH.

Witnesses:
   C. W. BURDICK,
   V. E. NICHOLS.